United States Patent [19]

Lindén et al.

[11] Patent Number: 4,579,871

[45] Date of Patent: Apr. 1, 1986

[54] METHOD OF RECLAIMING RUBBER

[75] Inventors: Berndt G. Lindén; Eugén C. E. Ganslandt, both of Trelleborg, Sweden

[73] Assignee: Trelleborg AB, Trelleborg, Sweden

[21] Appl. No.: 661,857

[22] Filed: Oct. 18, 1984

Related U.S. Application Data

[63] Continuation of Ser. No. 415,637, Sep. 7, 1982, abandoned.

[30] Foreign Application Priority Data

Sep. 10, 1981 [SE] Sweden .................................. 8105380

[51] Int. Cl.⁴ .......................... C08J 11/00; C08J 11/18;
   C08J 11/20; C08J 11/28
[52] U.S. Cl. ........................................ 521/43; 521/41;
   521/42.5; 521/44.5
[58] Field of Search ................. 260/720; 521/41, 44.5, 521/43

[56] References Cited

U.S. PATENT DOCUMENTS

| | | | |
|---|---|---|---|
| 2,415,449 | 2/1947 | Sverdrof et al. | 260/720 |
| 2,653,915 | 9/1955 | Elgin et al. | 260/720 |
| 3,700,615 | 10/1972 | Scott | 521/42.5 |

FOREIGN PATENT DOCUMENTS

| | | |
|---|---|---|
| 722575 | 7/1942 | Fed. Rep. of Germany . |
| 1237993 | 6/1960 | France . |
| 133369 | 10/1919 | United Kingdom . |
| 573053 | 11/1945 | United Kingdom . |
| 577829 | 6/1946 | United Kingdom . |
| 591787 | 8/1947 | United Kingdom . |
| 605588 | 7/1948 | United Kingdom . |

*Primary Examiner*—Allan M. Lieberman
*Attorney, Agent, or Firm*—Beveridge, DeGrandi & Weilacher

[57] ABSTRACT

Rubber crumb is subjected to direct reclaiming by being mixed with a plasticizer and optionally also a peptizer and, under agitation and supply of a gas atmosphere with controlled oxygen content and at a temperature of 130°–200° C., heated at substantially atmospheric pressure to cause the rubber particles to react with oxygen and absorb $\leq 10$, preferably 0.5–5 liters of $O_2$/kg of rubber particles.

19 Claims, 1 Drawing Figure

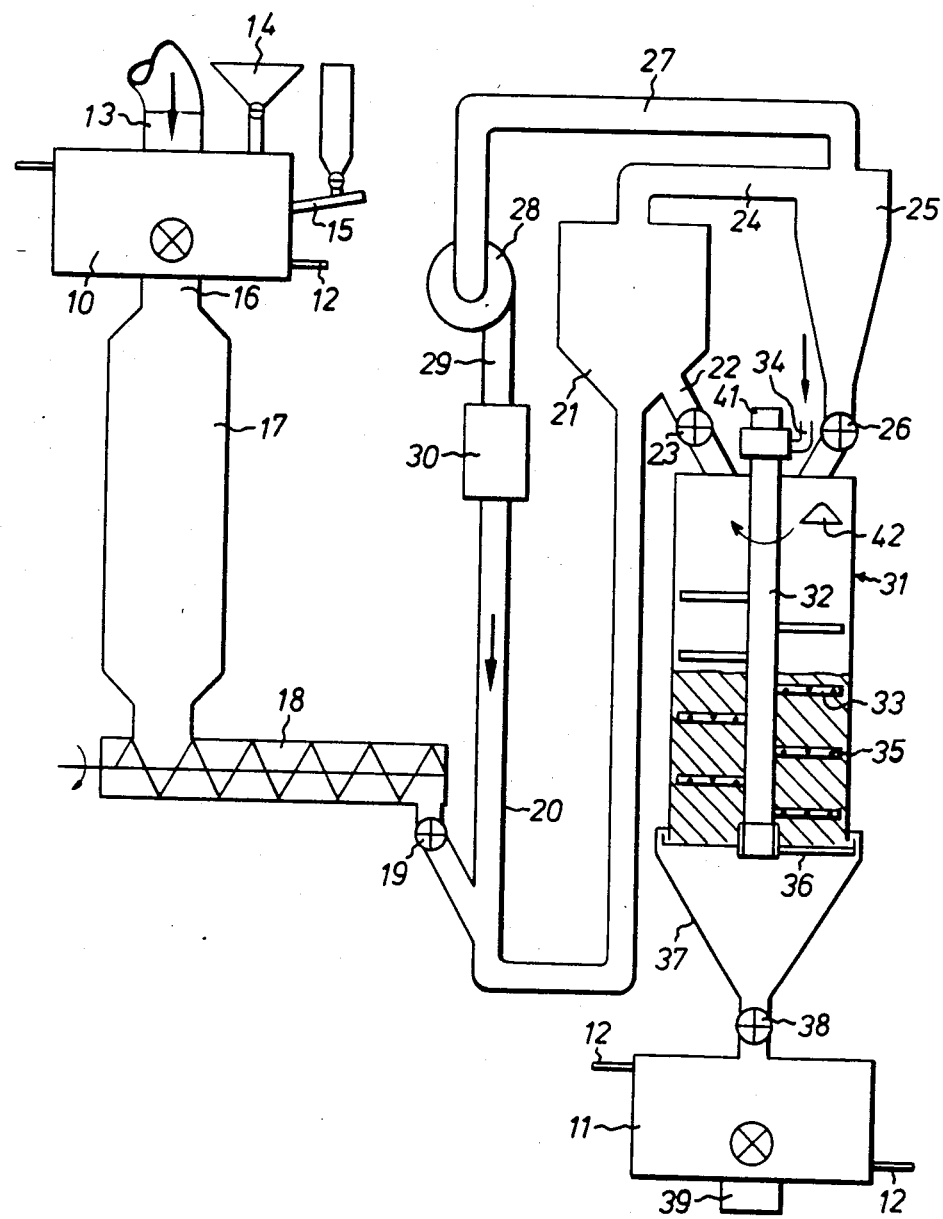

METHOD OF RECLAIMING RUBBER

This application is a continuation of application Ser. No. 415,637, filed 09-07-82 is now abandoned.

In the rubber industry, use is made of large quantities of reclaimed rubber which is produced by degradation of rubber scrap, for instance old vehicle tyres. In conventional cases, degradation of the rubber scrap is effected under the influence of heat, by mechanical processing or chemicals, the textile and metal impurities included in the rubber being at the same time removed either mechanically or chemically. Like raw rubber, reclaimed rubber is a plastic material which can be processed and vulcanized in the same manner as raw rubber.

There are many different conventional methods of reclaiming rubber scrap. The oldest method is the boiler or autoclave process in which the rubber scrap is heated in steam under pressure. In the autoclave process, use is made of high-pressure steam at a temperature of about 200° C. A method of this type is disclosed in British Pat. No. 591,787. Another conventional method is the acid process in which all fabric accompanying the rubber scrap is dissolved by boiling in acids, whereupon the remainder is plasticized in steam and flattened on a roller mill. A third conventional method is the alkali method in which caustic soda is used instead of acid to dissolve the textile material. Moreover, this method entails the removal of free sulphur and is not suitable in conjunction with chemical reclaiming agents and, therefore, has now become less important with the increasing occurrence of synthetic rubber in the rubber scrap. Use has also been made of the so-called neutral process in which metal chlorides are used instead of alkali to dissolve the textile material. The neutral method is generally carried out in large boilers in steam-heated water (temperature approx. 200° C.), the textile material being normally dissolved by means of calcium chloride. A fifth method is the thermomechanical or thermochemical process in which rubber scrap is processed at a high temperature in a closed mixer, generally a screw compounder or extruder, once the textile material has been mechanically removed. Examples of such processes are disclosed in U.S. patent specification Nos. 2,653,915 and 3,873,474, and British patent specification No. 577,829.

It has also been suggested to sear the surface of powdered rubber either with an open flame or with heated gas. This method is rather a type of pyrolysis which is effected at high temperatures, for instance 900° C. An example of such a reclaiming method is disclosed in British patent specification No. 1,501,865.

In Chemical Abstracts, Vol. 84 (1976), col. 45783h there is described a further method for reclaiming rubber scrap. This method may be described as direct reclaiming in the solid phase and comprises two operations, a first operation in which a mixture of natural rubber scrap crumb, process oil, phenyl hydrazine, ferrous chloride and methyl alcohol is agitated for 4 h, and a second operation during which the thus formed mixture is heated at 100° C. for 60 min. This prior art reclaiming method thus requires a relatively long processing time, i.e. 5 h. In EP published patent application No. 0,006,834 and corresponding Swedish patent application No. 7807479-6, there is disclosed another direct reclaiming method in which use is made of a special mixture of reducing agent, iron metal chloride and plasticizer in order, during a short period of agitation in the solid phase in air at a temperature of at most 100° C., to produce direct degradation of the double bonds in the rubber. As reducing agent, mention has been made of phenyl hydrazine or diphenylguanidine, while the iron metal chloride preferably is ferrous chloride. As plasticizer, use should be made of at least either of tall oil pitch and dipentene, or alternatively the plasticizer may consist of a mixture of at least either of these substances and any other suitable plasticizer, such as mineral process oil. The chemical direct reclaiming according to this prior art method offers great advantages but is disadvantageous in so far as there is a risk of benzene formation, which may be deleterious to the working environment.

In all prior art reclaiming methods, the raw material (i.e. the rubber scrap) is first broken and finely ground. In the autoclave, the thermochemical and the neutral process, the material, after the heat treatment, must also be subjected to an intensive mechanical processing in a roller mill or extruder, which is called "refining". This treatment is very energy consuming and requires much work, since the material is intensely heated during processing in the refining mill and the extruder. Thus, a great amount of heat energy must be dissipated by water cooling. Furthermore, the refining mill must be supervised, and great skill is required for adjusting the mill to achieve optimum results.

In a further development of the conventional neutral process, the autoclaved rubber material, after hot-air drying, has instead been exposed to cryomilling in a mill, for example a vibration mill or a rotary blade mill, in which the material is maintained cooled below −60° C. by supplying a coolant, in particular liquid nitrogen or carbonic acid. It is true that this cryomilling implies a considerable energy saving, but also this prior art variant of the neutral process entails a high total energy consumption.

The drawbacks inherent in the first five conventional reclaiming methods thus primarily are high production costs in the form of wages and energy consumption. Another disadvantag inherent in these methods is that the rubber scrap, after the reclaiming proper, i.e. the degradation of double bonds in the rubber material, must be subjected to a special refining method in order to be usable as raw material for new vulcanized rubber products.

Direct reclaiming in accordance with the above-mentioned sixth method (Chemical Abstracts, Vol. 84) admittedly is an improvement of the other prior art reclaiming methods, but still necessitates a relatively long processing time and unnecessary working operations. In the other chemical direct reclaiming method (EP 0,006,834) it is possible to dispense with the costly and energy-consuming refining operation and, moreover, considerably simplify and cheapen the reclaiming method, it is true, but the special combination of plasticizer and Redox system with a special catalyst as used in the chemical direct reclaiming method may, in some instances, entail undesired benzene formation with ensuing problems in respect of the working environment.

Th present invention has for its object to provide a method of reclaiming in which the double bonds in the rubber are broken by exposing the rubber to a raised temperature, without the need of a raised pressure, in the presence of a reclaiming aid, which entails fewer problems, if any at all, in respect of the working environment, such as benzene formation, this reclaiming being carried out either semi-continuously or continuously.

In the method of the invention, as in the prior art direct reclaiming methods, use is made of ground or broken rubber scrap which is in the form of rubber particles with a particle size of at most 1 mm, preferably at most 0.6 mm, and which has been freed of the major portion of its textile and metal impurities. These rubber particles are mixed with a reclaiming aid comprising plasticizers and optionally also peptizers, and are exposed in the solid phase to a raised temperature for breaking the double bonds in the rubber. According to the invention, the rubber particles in the form of a granular mass having a temperature of 130°-200° C. should be subjected under agitation to a gas atmosphere consisting of inert gas and optionally containing oxygen, the oxygen content and the amount supplied of the gas atmosphere and the temperature of the granular mass being adjusted so as to limit the oxygen absorption of the rubber particles during the reaction to $\leq 10$, preferably 0.5–5 litres of $O_2$/kg of rubber particles. The oxygen volume stated is the amount of oxygen at NTP, i.e. at 20° C. and atmospheric pressure. The novel features of the invention will appear from the claims.

The gas atmosphere with controlled oxygen content may consist of a pure inert gas, the required oxygen being the residual oxygen in the pulverulent rubber mass. The inert gas atmosphere used for heating and reclaiming may consist of air, but preferably has an oxygen content of up to 12.5% by volume, most preferably at most 6% by volume. It has been found that an increase of the oxygen content within the oxygen content range need be accompanied by a reduction of the temperature within the stated temperature range, in order that the desired limitation of the oxygen absorption to $\leq 10$, preferably 0.5–10 l of $O_2$/kg of rubber particles should be obtained.

As mentioned above, the method according to the invention can be carried out semi-continuously or continuously. In both instances, the rubber particles are mixed with the reclaiming aids to form a substantially homogeneous granular mass, through which the gas atmosphere is thereafter passed, preferably under constant agitation. In the continuous method, agitation can be carried out in a throughflow reactor at the top of which a new mixture of rubber particles and reclaiming aids is charged and at the lower end of which finally reclaimed rubber particles are discharged. In the throughflow reactor, use is made in this case preferably of an agitator having a number of agitator blades at different heights, the gas atmosphere being charged through a piping system in the agitator such that the gas atmosphere is supplied at different levels in the reactor.

The amount of plasticizer added to the rubber particles in the method according to the invention preferably is 5–30 parts by weight of plasticizer/100 parts by weight of rubber crumb. The most preferred amount of plasticizer is 10–20 parts by weight/100 parts by weight of rubber. As plasticizer, use is preferably made of tall oil pitch or aromatic or naphthenic mineral oils. Tall and rosin oils as well as wood and coal tar fractions whose boiling point is above the process temperature (130°-200° C.) can also be used. Thus, dipentene is not suitable, since it boils at a temperature below the process temperature. Cumarone resin, wood rosin and petroleum resins are also usable.

As mentioned above, it is possible in the method according to the invention to use a peptizer together with the plasticizer. As peptizer, use is preferably made of a diaryl disulphide, but also other substances, such as thiophenol and their zinc salts (including chlorine-containing thiophenols and their zinc salts), aromatic and aliphatic mercaptans as well as modified diaryl disulphides, such as polyalkyl hydroxy aryl disulphides, are usable.

As mentioned above, the oxygen absorption of the rubber particles in the reaction should be limited to $\leq 10$, preferably 0.5–10, and most preferably 0.5–5 l. $O_2$/kg rubber particles. The best results have hitherto been achieved at an oxygen absorption of <4 l. $O_2$/kg rubber particles. A high oxygen content in the indicated range requires lower temperatures within the range of 130°-200° C. If one chooses to limit the oxygen absorption of the rubber particles by supplying an inert gas only, a higher temperature is required within the indicated temperature range. Thus, if the reaction is conducted solely by means of the oxygen which remains in the mass of rubber particles, a temperature of about 180° C. can be used, while a temperature of about 130° C. can be used if the oxygen absorption is adjusted to about 5 l. $O_2$/kg rubber or slightly below. A preferred temperature range is 150°-170° C.

The residence time in the reactor is not particularly critical, since the oxygen absorption of the particles in the reaction can be controlled mostly by adjusting the composition and temperature of the inert gas atmosphere. Generally, it is however preferred to use residence times of 3–90 min., preferably 15–45 min. in the reactor.

The degree of degradation of the double bonds in the rubber crumb is dependent upon different parameters, such as the starting material, for instance if it is natural rubber or styrene butadiene rubber scrap, the processing temperature, the concentration and the flow rate of the oxygen present, the time during which the oxygen is allowed to act on the rubber crumb (which can also be expressed as the amount of oxygen absorbed by the rubber crumb), and the addition of reclaiming aids.

A great advantage of the method according to the invention is that it can be carried out at atmospheric pressure and so, there is no need of autoclaves and high-pressure vessels. Therefore, the preferred pressure is substantially atmospheric pressure during the reaction process.

The reclaiming process is performed in the four stages, i.e. blending the rubber crumb with the plasticizer and the peptizer, if any, heating this mixture to the indicated temperature, reacting it with the gas atmosphere, and finally cooling the reclaimed crumb to below 90° C. These four stages may be wholly or partly overlapping, for instance in that the crumb is heated at the same time as it is mixed with plasticizer and peptizer, if any, or during the reaction between oxygen and rubber crumb. However, to obtain optimum reclaiming results, the oxygen absorption must be carefully adjusted. Also during cooling of the reclaimed crumb to a temperature below 90° C., it is necessary to adjust the amount of oxygen in the rubber crumb, and not until the rubber crumb has been cooled to below 90° C., is it possible to take out the rubber crumb in the open air without the risk of spontaneous ignition of the rubber crumb. However, the rubber crumb should be cooled to below 50° C. as soon as possible after the reclaiming process.

In continuous reclaiming, it is possible when starting up the process to supply hot gas atmosphere in order thereafter, during the continuous process, to supply cold gas atmosphere for the reaction.

In order to facilitate the use of the future reclaim and also storage and handling thereof, the tendency to conglomeration of the rubber crumb can be reduced by admixing an antitackifier, for instance common kaolin, talc, silicon dioxide or the like. This admixture may be carried out simultaneously or in conjunction with the addition of the plasticizer and the peptizer, if any.

In the appended drawing, there is schematically shown an experimental plant used in the following Example 10.

The plant comprises two mixers 10, 11 both of which were of the make Lödige and both of which comprised a horizontal agitator with paddles (about 200 rpm) and a high-speed horizontal paddle mixer (about 3000 rpm). Both mixers have connections 12 for the supply of heating medium and cooling medium, respectively. In the mixer 10 open a supply pipe for charging rubber crumb, a hopper 14 for feeding reclaiming aids and a device 15 for feeding antitackifiers. The outlet 16 of the mixer 10 is connected to a storage chamber 17 which is intended to serve as a buffer store. The lower end of the storage chamber is connected to a feed screw 18 which is used as a metering device and whose outlet by the intermediary of a rotary vane feeder 19 opens in a conveyor pipe 20 of a pneumatic conveyor system. The conveyor pipe 20 is connected to the lower end of a turbulence chamber 21 which has a bottom outlet 22 with a rotary vane feeder 23. At its upper end, the turbulence chamber has a gas overflow pipe 24 which opens into the upper end of a dust separator 25 in the form of a cyclone. The lower end of the dust separator is connected to a rotary vane feeder 26. The gas outlet 27 of the dust separator communicates with a fan 28 whose outlet 29 opens in a heating device 30 from which the conveyor pipe 20 extends.

The two rotary vane feeders 23, 26 open in the upper end of a reactor 31 which contains an agitator 32 with a number of agitator vanes or arms 33 on different levels. The agitator 32 is so designed that gas can be supplied through an inlet 34 and charged through suitably distributed feed holes 35 in the different agitator arms or vanes. At its lower end, the reactor has a bottom with a discharge slot 36 through which the reclaim drops into a discharge hopper 37 which is connected by a rotary vane feeder 38 to the inlet of the mixer 11. The mixer 11 has an outlet 39.

The reactor 31 has a motor 41 for driving the agitator 32 and also has a level sensor 42 for sensing the level of the batch in the reactor and for controlling the inlet and outlet valves 23, 26 and 38.

In the following Examples, the different reclaim powders were evaluated using the following rubber compounding recipe:

| Reclaim | 1400 g |
| --- | --- |
| Zinc oxide | 28 g |
| Stearic acid | 12.6 g |
| Sulphur ® | 15.4 g |
| SANTOCURE (accelerator) (cyclohexyl benzothiazyl sulphenamide) | 9.8 g |

In the evaluation of the different reclaimed rubber crumbs, the above constituents were mixed in two stages, i.e. a first stage in a 1.5 dm³ laboratory-scale Banbury mixer at a temperature of about 50° C., and a second stage in a laboratory-scale mixing mill at a temperature of about 50° C. When mixing in the Banbury mixer, the reclaim was first added and after a mixing time of 2 min. the zinc oxide and the stearic acid were added. After another 0.5 min., the sulphur and the accelerator were charged, and the batch was withdrawn from the mixer after a total mixing time of 3 min. Stage 2 in the laboratory-scale mill was carried out with a 1.5 mm roll nip, the rubber mixture withdrawn from the Banbury mixer being processed for 5 min. In this treatment, the time up to band-forming was observed and recorded. The rubber mixture was formed into testpieces and was vulcanized at 160° C. for 10 min.

The invention will be described in greater detail hereinbelow by way of a few Examples in which Examples 1–9 were carried out batchwise and Example 10 was carried out semi-continuously and continuously.

In all cases, use was made of two mixers of the Lödige make, one being used for blending the rubber crumb with reclaiming aid and optionally antitackifier, and the other being used for cooling the finished reclaim to below 90° C. The mixer used for preparing the raw material was heated in Examples 1–9 with hot oil in order to raise the temperature of the reaction mixture to the reclaiming temperature range during the mixing process. The equipment also included feed devices for supplying the gas atmosphere used for reclaiming, and heating hereof.

EXAMPLE 1

In this Example, use was made of a rubber crumb which emanated substantially from lorry tyre treads and which had a relatively high content of natural rubber and had been ground to a particle size of <0.4 mm. This crumb was mixed with tall oil pitch (plasticizer) and diaryl disulphide (peptizer) in the mixer which was provided with a horizontal agitator with vanes (driven at about 200 rpm) and a high-speed transverse blade mixer (about 3000 rpm). Both the vane and blade mixer units were run during the heating process in order to obtain optimum mixing results.

Before the rubber crumb was supplied to the mixer, the entire equipment was flushed with nitrogen gas so as to bring the oxygen content to below about 0.2%. During the entire process, nitrogen was injected in the different parts of the equipment in order to maintain an inert atmosphere and actually permit controlling the oxygen absorption of the rubber crumb, as desired. When charging the rubber crumb in the mixer used for blending rubber crumb and reclaiming aid, additional nitrogen was injected in order to drive off the major portion of the oxygen entrained.

In this Example, 100 parts by weight (=33.6 kg) of rubber crumb were mixed with 15 parts by weight of tall oil pitch and 0.5 parts by weight of diaryl disulphide. The mixing process was conducted for 60 min., the mixture being heated to about 180° C. A few minutes before the temperature had reached this level, 3.5 parts by weight of finely divided silicon dioxide were added to inhibit conglomeration of the rubber crumb.

At the end of the heating process, the batch was emptied into a heated storage chamber flushed with nitrogen gas. The storage chamber contained nitrogen gas, and the temperature of the rubber crumb was kept at about 180° C. for about 60 min. The batch was thereafter placed in the second mixer to be cooled therein to room temperature, which required about 20 min.

The reclaimed rubber crumb was still in the pulverulent state and after mixing with vulcanizing agent in an internal mixer of laboratory size (1.5 l. Banbury laboratory-scale mixer) and subsequent rolling in a laboratory-scale mixing mill there was immediately obtained a coherent soft rubber slab or band.

The properties of the resulting rubber reclaim were tested. Mooney viscosity at 100° C. was tested on the mixture with vulicanizing agent. The other physical properties were tested on 2 mm vulcanized sheets. The result of the tests appears from Table 1.

EXAMPLE 2

In this Example, use was made of the same equipment as in Example 1. In this case, the material was not kept in the storage chamber but was emptied directly from the first mixer in which the mixture had been heated to reaction temperature, into the mixer used for the cooling process. As starting material, use was made of rubber crumb of a particle size of <0.4 mm. This rubber crumb had been obtained by grinding a mixture of treads from car tyres and lorry tyres and had a textile content of about 0.4%.

During the entire heating and reaction time in the first mixer, an atmosphere consisting of nitrogen gas and air and having an oxygen content of about 17% was injected in the mixer at a rate of about 1000 l/h. The reaction mixture consisted of 100 parts by weight of rubber crumb, 15 parts by weight of tall oil pitch (preheated to about 60° C.), and 0.5 parts by weight of diaryl disulphide.

The mixer was heated in that hot oil at a temperature of about 185° C. was fed through the heating jacket of the mixer, and the heating and mixing process proceeded until a temperature of about 160° C. had been obtained in the rubber material after 27 min. The reaction was then allowed to proceed for another 3 min. at a temperature of about 160° C.

A marked reduction of the oxygen content in the mixer could be observed already at a batch temperature of 100° C. which was obtained after 5 min. The reaction with oxygen became stronger as the temperature increased and at emptying only 1.7% of oxygen was measured in the passing gas mixture. The amount of oxygen absorbed was measured at about 1 l/kg of rubber crumb.

At the end of the reaction time, the reclaim was emptied into the mixer used for cooling. Simultaneously, 3.5 parts by weight of finely divided silicon dioxide were added in order to inhibit conglomeration of the rubber crumb. During the admixture of the silicon dioxide and for 2 min. thereafter, the blade mixer part of the mixer was run in order to achieve a satisfactory distribution of the silicon dioxide. During the entire cooling process, the vane mixer part was run and the cooling jacket of the mixer was fed with cooling water (at about 10°-15° C.).

The reclaim resulting from this Example had a slightly higher viscosity than the reclaim of Example 1, and the time up to band-forming on a roll was about 1 min., while the tensile strength at break was unusually high (10 MPa) for a reclaim. The different test results appear from Table 1.

EXAMPLE 3

This Example was carried out with the same equipment as in Examples 1 and 2. Heating and reaction were carried out in the first mixer, as in Example 2. As starting material, use was made of rubber crumb having a particle size of below 0.8 mm and substantially obtained from waste car tyres. The textile content of the rubber crumb was about 0.2%.

During the entire heating and reaction process in the mixer, air was injected at a rate of 800 l/h. The reaction mixture consisted of 100 parts by weight of rubber crumb, 15 parts by weight of tall oil pitch, and 1 part by weight of diaryl disulphide. The mixture was heated to about 130° C. by feeding hot oil at a temperature of about 150° C. into the heating jacket of the mixer. The heating required 25 min., whereupon the temperature of the hot oil was so adjusted that the temperature of the batch was maintained at about 130° C. for another 90 min. The blade mixer part of the mixer was run during the heating process only.

During the reaction at 130° C., the rubber crumb absorbed about 55% of the oxygen supplied. The total absorption of oxygen was measured at about 3.7 l/kg of rubber crumb.

After the reaction, the reclaim was transferred to the cooled mixer in which 3.5 parts by weight of finely divided silicon dioxide were added, as in Example 2. After cooling, the reclaim was tested and it was established that the reclaim immediately formed band on the mill rolls. The tensile strength at break was however relatively low. The test results appear from Table 1.

EXAMPLE 4

Heating and reaction were carried out in the same manner as in Examples 2 and 3. As starting material, use was made of rubber crumb having a particle size of less than 0.6 mm and consisting substantially of waste from car tyres. The textile content was about 0.3%.

Heating was carried out in a nitrogen atmosphere with less than 0.2% of oxygen, and a mixture of air and nitrogen with an oxygen content of about 8% was injected only after the reaction temperature had been attained. The mixture was injected at a rate of about 1500 l/h. 100 parts by weight of rubber crumb were mixed with 15 parts by weight of tall oil pitch and 0.5 parts by weight of diaryl disulphide and heated to about 170° C. for 45 min. The reaction was then caused to proceed for 12 min. at about 170° C., said mixture of air and nitrogen being charged. The reclaim was thereafter transferred to another mixer in which silicon dioxide was supplied and the reclaim was cooled in the same manner as in Example 2.

In the reaction, the material absorbed about 0.5 l. oxygen/kg. The reclaim immediately formed a band on the mill rolls, and the results of the different tests appear from Table 1.

EXAMPLE 5

This Example was carried out in the same way as Examples 2 and 3. As plasticizer, use was however made of 7.5% by weight of tall oil pitch. As previously, 0.5 parts by weight of diaryl disulphide was added. The starting material was substantially car tyre waste having a particle size of less than 0.4 mm and a textile content of about 0.3%. During both heating and reaction, about 1000 l/h of a gas mixture consisting of air and nitroqen with an oxygen content of about 8% were injected. The rubber crumb and the reclaiming aids were heated to about 160° C., whereupon the reaction was allowed to proceed at this temperature for 30 min. Cooling and addition of silicon dioxide were carried out in the same way as in Example 2. The total oxygen absorption was about 1.6 l/kg of batch.

The reclaim formed a band on the mill rolls after about 1 min., but the viscosity was slightly higher than normal as a result of the small addition of plasticizer, and the processing properties were slightly poorer. The results appear from Table 1.

EXAMPLE 6

This Example was conducted in the same way as Example 5, use being however made of 15 parts by weight of tall oil pitch. The starting material and the other conditions were the same as in Example 5. In this case, the reclaim formed a band on the mill rolls immediately, and the viscosity was lower than in Example 5 where only 7.5 parts by weight of plasticizer were added. The other results appear from Table 1.

EXAMPLE 7

This Example is a repetition of Examples 5 and 6, 15 parts by weight of highly aromatic oil ("MOBILSOL 30" with an aniline point of 44.8° C.) were used as plasticizer. The starting material and the other conditions were the same as in Examples 5 and 6. Oxygen absorption was the same as in Examples 5 and 6, i.e. about 1.6 l/kg. The Mooney viscosity was higher than in Example 6, which indicates that degradation was greater with tall oil pitch than with the highly aromatic oil now used. The hardness was also considerably lower when using the highly aromatic oil. The test results appear from Table 1.

EXAMPLE 8

This Example was conducted in the same way as Examples 2, 3 and 5–7. As starting material, use was made of ground car tyres. The rubber crumb had a particle size of less than 0.5 mm and the textile material had been separated by sieving.

In this Example, the plasticizer content was increased to 25 parts by weight of tall oil pitch, and no peptizer was added.

A stream of inert gas with about 6% of oxygen was injected in the mixer at a rate of about 1000 l/h during the heating process and thereafter for another 30 min. after attaining the reaction temperature of about 160° C. By this adjustment of the process conditions, the material was caused to absorb about 1.4 l of oxygen/kg.

The resulting reclaim immediately formed a band on the mill rolls, Mooney viscosity was relatively low, and the tensile strength at break was normal for whole tyre reclaims despite the relatively high plasticizer content. This test shows that there is no need of peptizer if the plasticizer content is slightly raised.

EXAMPLE 9

In this Example, the experiment was carried out in the same way as in Examples 2, 3 and 5–8. As starting material, use was made of ground car tyres with a relatively high content of styrene rubber. The rubber crumb had a particle size of less than 0.4 mm, and the textile had been separated by sieving so as to give a textile content of about 0.15%.

As reaction mixture, use was made of 100 parts by weight of rubber crumb, 20 parts by weight of tall oil pitch and 0.5 parts by weight of diaryl disulphide. In connection with cooling, 3.5 parts by weight of finely divided silicon dioxide were added as antitackifier.

During heating and reaction, a gas mixture of air and nitrogen with an oxygen content of about 13% was injected. The supply rate was about 1000 l/h.

During heating to about 160° C., the batch absorbed about 0.7 l of oxygen/kg, and in the reaction during the subsequent 30 min. at about 160° C., about 1.5 l of oxygen/kg were additionally absorbed by the batch. The total oxygen absorption thus was about 2.2 l of oxygen/kg.

The reclaim proved to possess good processing properties, and also the other physical properties were satisfactory. The results appear from Table 1.

This experiment shows that also rubber material with a relatively high content of styrene rubber is readily reclaimed, for instance by adjusting the admixture of plasticizer.

EXAMPLE 10

This Example was carried out as a continuous reclaiming process using the plant shown in the appended drawing and in which mixing and cooling are carried out batchwise while charging, heating, reclaiming, and discharging were carried out continuously.

In this Example, use was made of the same recipe as in Example 1, the rubber crumb consisting substantially of ground car tyres and having a particle size of less than 0.4 mm and a textile content of less than 1%.

The two mixers 10 and 11 were 130 dm$^3$ Lödige mixers. The continuous process can be divided into the steps of (1) mixing, (2) storing and charging, (3) heating, (4) reclaiming in reactor, and (5) cooling.

In process step 1, rubber crumb is mixed with plasticizer, peptizer and antitackifier at room temperature. Mixing was carried out batchwise for about 6 min. The high-speed blade mixer part of the mixer was used for the last two minutes in order to achieve satisfactory distribution of the constituents. In this Example, the mixing process was conducted without any supply of heat, an inert atmosphere (in this case nitrogen gas) being maintained in the mixer. Mixing may however also be carried out in a continuous mixer also conveying the batch.

In process step 2, the blended batch was stored in the storage container 17 from which it was discharged by means of the metering conveyor 14. The storage chamber 17 thus serves as a buffer store which ensures continuous feeding into the heating system 20–30. In both the storage chamber 17 and the conveyor screw 18, there was maintained an inert atmosphere.

In process step 3, the batch was continuously heated to the desired temperature while using a controlled gas atmosphere which in this Example consisted substantially of nitrogen. The heating system thus comprises conveyor pipe 20, turbulence chamber 21, cyclone 25, fan 28, and the electric heat exchanger 30. The batch was rapidly heated to about 160° C. in the nitrogen gas atmosphere containing less than 0.6% of oxygen.

It was found that heating the rubber crumb by means of a circulating nitrogen gas stream entailed the advantage that very rapid heating (10–20 s.) was obtained and that no actual degradation of the rubber occurred until in the reactor. As a result, the final oxygen absorption and reclaiming degree could be better controlled.

From the turbulence chamber 21 and the cyclone 25, the heated batch was continuously fed through the two rotary vane feeders 23, 26 and down into the reactor 31.

In process step 4 reclaiming was thus conducted in the reactor 31 which in this Example had a cylindrical upper part with a diameter of 800 mm and a height of 2 m. At the lower end of the cylindrical part, there was provided a bottom rotating along with the agitator and having a discharge slot. A stationary rake (not shown) was provided directly above the bottom to assist in discharging of the batch. The level of the batch in the cylindrical part was kept constant by adjusting the rotary speed of the agitator in dependence upon the batch level sensed by means of the level sensor 42. The residence time in the reactor could be varied by varying the speed of the metering screw 18 in combination with an adjustment of the rotary speed of the agitator. The amount of oxygen absorbed could be controlled by varying the amount and/or the oxygen content of the gas mixture injected in the reactor, these two variables being adjusted to the throughflow rate, temperature and residence time of the batch.

ple, cooling was thus carried out batchwise, an inert gas atmosphere being maintained by charging nitrogen gas into the mixer. Cooling may however also be conducted in a continuous jacket-equipped mixer, it being necessary to control the process in such a manner that the reclaim when being discharged has a temperature of below 90° C. Other cooling systems may also be used, for instance a cooling system of the pneumatic conveyor type, where the above-indicated heating unit 30 is replaced by a cooling system.

The pulverulent reclaim withdrawn from the mixer 11 directly formed a band on the rolls when rolled in a laboratory-scale mixing mill. Mooney viscosity at 100° C. was tested in the same way as earlier and was 45–54 upon withdrawal of several samples after varying times. The tensile strength at break was about 6.4 MPa and the elongation at break was about 250%.

| EXAMPLE | 1 | 2 | 3 | 4 | 5 | 6 | 7 | 8 | 9 | 10 |
|---|---|---|---|---|---|---|---|---|---|---|
| Recipe (parts by weight): | | | | | | | | | | |
| Rubber crumb | 100 | 100 | 100 | 100 | 100 | 100 | 100 | 100 | 100 | 100 |
| Tall oil pitch | 15 | 15 | 15 | 15 | 7.5 | 15 | — | 25 | 20 | 15 |
| Highly aromatic oil | — | — | — | — | — | — | 15 | — | — | — |
| Diaryl disulphide | 0.5 | 0.5 | 1.0 | 0.5 | 0.5 | 0.5 | 0.5 | — | 0.5 | 0.5 |
| Silicon dioxide | 3.5 | 3.5 | 3.5 | 3.5 | 3.5 | 3.5 | 3.5 | 3.5 | 3.5 | 3.5 |
| Reaction conditions: | | | | | | | | | | |
| Reaction time, min. | 60 | 3 | 90 | 12 | 30 | 30 | 30 | 30 | 30 | 45 |
| Temperature, °C. | 180 | 160 | 130 | 170 | 160 | 160 | 160 | 160 | 160 | 160 |
| $O_2 + N_2$ l/h | 900 | 1000 | 800 | 1500 | 1000 | 1000 | 1000 | 1000 | 1000 | 18000 |
| $O_2$ content, % | ~0 | 17 | 20.9 | 8 | 8 | 8 | 8 | 8 | 6 | 13 | 3.5 |
| $O_2$ absorption, l/kg | ~0.2 | 1.0 | 3.7 | 0.5 | 1.6 | 1.6 | 1.6 | 1.4 | 2.2 | 1.3 |
| Test results: | | | | | | | | | | |
| Time to banding on rolls | 0 | 1 | 0 | 0 | 1 | 0 | 0 | 0 | 0 | 0 |
| Mooney viscosity R = L, 100° C. | 43 | 67 | 57 | 66 | 89 | 49 | 67 | 39 | 49 | 45–54 |
| Hardness, °IRH | 54 | 61 | 61 | 62 | 61 | 59 | 53 | 58 | 53 | 59–61 |
| Tensile strength at break, MPa | 8.0 | 10.0 | 5.6 | 7.2 | 9.3 | 5.9 | 5.7 | 6.0 | 6.2 | 6.1–6.5 |
| Elongation at break % | 320 | 240 | 240 | 270 | 210 | 250 | 240 | 280 | 310 | 230–250 |

In this Example, the batch level in the mixer was maintained constant by means of the sensed values derived from the level sensor 42 but might also be carried out by mounting the reactor on a weighing equipment, the batch level being controlled by maintaining the mass of material constant.

In this Example, the cylindrical part of the reactor was filled to a height of approximately 900 mm, this height being maintained by successively supplying new material when the agitator 32 had been started. A mixture of 3000 l of air/h and 15,000 l of nitrogen gas/h was injected in the batch through the feed holes 35 of the agitator. This gas mixture had ambient temperature, i.e. substantially room temperature, under constant operational conditions. The batch heated to reaction temperature was thus caused to gradually sink through the cylindrical part of the reactor in order, during this passage, to be subjected to the gas atmosphere.

In this Example, the material flow was controlled in such a manner that the residence time in the reactor was about 45 min. The temperature of the batch increased by the reaction heat from the initial temperature of about 160° C. to about 167° C. at the lower end of the cylindrical part of the reactor. During reclaiming, the rubber absorbed about 1.3 l of $O_2$/kg.

In final process step 5, cooling was effected in that the batch, through the discharge hopper 37 and the rotary vane feeder 38, was fed into the jacket-equipped mixer 11 in which it was cooled to below 90° C. In this Exam-

What we claim and desire to secure by Letters Patent is:

1. A method of reclaiming rubber comprising mixing ground or broken rubber scrap which is in the form of rubber particles having a particle size of at most 1 mm, and which has been freed of the major portion of its textile and metal impurities with at least one reclaiming aid comprising a plasticizer, subjecting the rubber particles and plasticizer to a sufficiently elevated process temperature of 130°–200° C. at substantially atmospheric pressure in order to achieve breakage of the double bonds in the rubber, while agitating the rubber particles in the form of a granular mass and blowing a controlled inert gas atmosphere through the granular mass, said plasticizer boiling at a temperature above said process temperature and wherein oxygen is present in said inert gas or is present in the rubber scrap, controlling the oxygen content in contact with said rubber scrap so as to limit the oxygen absorption of the rubber particles during the reaction to $\leq 10$ liter of $O_2$/kg of rubber particles, said plasticizer being present in an amount sufficient to achieve breakage of the double bonds inthe rubber, and thereafter cooling the rubber particles to below about 90? C. before they are allowed to enter into contact with the surrounding atmosphere wherein said rubber particles remain in the pulverulent state.

2. A method of reclaiming rubber as set forth in claim 1 further comprising first mixing ground or broken rubber scrap which is in the form of rubber particles having a particle size of at most 1 mm, and which has been freed of the major portion of its textile and metal impurities with at least one reclaiming aid comprising a plasticizer boiling at a temperature above said process temperature, under an essentially inert atmosphere, subjecting the rubber scrap to a sufficiently elevated process temperature of 130°-200° C. at substantially atmosphereic pressure, agitating the rubber particles at said elevated temperature and blowing a gas into the rubber particles, said gas being previously inert and wherein oxygen is present in said gas or is present in the rubber scrap, controlling the oxygen content in contact with said rubber scrap during the process so as to limit the oxygen absorption of the rubber particles during the reaction to $\leqq 10$ liter of $O_2$/kg of rubber particles, said plasticizer and being present in an amount sufficient to achieve breakage of the double bonds in the rubber and thereafter cooling the rubber particles to a temperature of less than about 90° C. with agitation.

3. The method of claim 1, wherein the amount of oxygen absorption during the reaction is less than 4 l $O_2$/kg of rubber particle.

4. The method of claim 1, wherein the amount of oxygen absorption during the reaction is 0.5 to 10 l $O_2$/kg of rubber particle.

5. The method of claim 4, wherein the amount of oxygen absorption during the reaction is 0.5 to 5 l $O_2$/kg of rubber particle.

6. The method of claim 1, wherein a peptizer is used together with the plasticizer.

7. The method of claim 1, wherein the rubber scrap has a particle size of at most 0.6 mm.

8. The method of claim 1, wherein the reaction proceeds for 3-90 min., at the reaction temperature.

9. The method of claim 8, wherein the reaction proceeds for 15-45 minutes.

10. The method of claim 1, wherein the granular mass is agitated by means of an agitator during the reclaiming process, and the gas atmosphere is supplied through outlets in the agitator means of the agitator.

11. The method of claim 1, wherein the rubber particles are mixed with 5-30 parts by weight of plasticizer per 100 parts by weight of rubber particles.

12. The method of claim 11, wherein the amount of plasticizer is 10-20 parts by weight.

13. The method of claim 1, wherein the rubber particles are mixed with at most 1 part by weight of peptizer per 100 parts by weight of rubber particles.

14. The method of claim 6, wherein a diaryl disulphide, a thiophenol or an aromatic or aliphatic mercaptan is added as the peptizer.

15. The method of claim 1, wherein the rubber Particles after thorough blending with the reclaiming aid are heated to reaction temperature by means of a hot gas during conveyance to the upper end of a reaction chamber in which the rubber particles are introduced in order to form therein a successively sinking granular mass which is agitated and through which the controlled gas atmosphere is blown and which at the lower end of the reaction chamber is discharged to a cooler in which the rubber particles are cooled to below 90° C. before they are allowed to enter into contact with the surrounding atmosphere.

16. The method of claim 1, wherein the rubber particles are thereafter cooled in an inert gas atmosphere.

17. A method of reclaiming rubber comprising mixing ground or broken rubber scrap which is in the form of rubber particles having a particle size of at most 1 mm, and which has been freed of the major portion of its textile and metal impurities with at least one reclaiming aid comprising a plasticizer and while agitating the rubber particles in the form of a grannular mass and subjecting the rubber scrap to a sufficiently elevated process temperature of 130°-200° C. at substantially atmospheric pressure in order to achieve breakage of the double bonds in the rubber, in the presence of an inert gas atmosphere, said plasticizer boiling at a temperature above said process temperature and being selected from the group consisting of tall oil pitch aromatic mineral oil and naphthenic mineral oil and wherein oxygen is present in said inert gas or is present in the rubber scrap, controlling the oxygen content in contact with said rubber scrap so as to limit the oxygen absorption of the rubber particles during the reaction to $\leqq 10$ lier of $O_2$/kg of rubber particles, said plasticizer being present in an amount sufficient to achieve breakage of the double bonds in the rubber.

18. A method of reclaiming rubber comprising mixing ground or broken rubber scrap which is in the form of rubber particles having a particle size of at most 1 mm, and which has been freed of the major portion of its textile and metal impurities with at least one reclaiming aid comprising a plasticizer boiling at a temperature above said process temperature, and a peptizer selected from the group consisting of diaryl disulphide, a thiophenol, and an aromatic or aliphatic mercaptan, in the amount of 1 part by weight of said peptizer per 100 parts rubber, and while agitating the rubber particles in the form of a granular mass and subjecting the rubber scrap to a sufficiently elevated process temperature of 130°-200° C. at substantially atmospheric pressure in order to achieve breakage of the double bonds in the rubber in an inert gas atmosphere, and wherein oxygen is present in said inert gas or is present in the rubber scrap, controlling the oxygen content in contact with said rubber scrap so as to limit the oxygen absorption of the rubber particles during the reaction to $\leqq 10$ liter of $O_2$/kg of rubber particles, said plasticizer and being present in an amount sufficient to achieve breakage of the double bonds in the rubber.

19. A method of reclaiming rubber comprising mixing ground or borken rubber scrap which is in the form of rubber particles having a particle size of at most 1 mm, and which has been freed of the major portion of its textile and metal impurities with at least one reclaiming aid comprising a plasticizer boiling at a temperature above said process temperature, and a peptizer in the amount of no more than 1 part by weight of said peptizer per 100 parts rubber, and while agitating the rubber particles in the form of a granular mass and blowing a controlled inert gas atmosphere through the granular mass and subjecting the rubber scrap to a sufficiently elevated process temperature of 130°-200° C. at substantially atmosphereic pressure in order to achieve breakage of the double bonds in the rubber,
and wherein oxygen is present in said inert gas or is present in the rubber scrap, controlling the oxygen content in contact with said rubber scrap so as to limit the oxygen absorption of the rubber particles during the reaction to $\leqq 10$ liter of $O_2$/kg of rubber particles, said plasticizer being present in an amount sufficient to achieve breakage of the double bonds in the rubber, wherein said rubber particles remain in the pulverulent state.

* * * * *